United States Patent [19]

McHale

[11] Patent Number: 4,600,700

[45] Date of Patent: Jul. 15, 1986

[54] REGENERATION OF PLATINUM-CONTAINING ZEOLITE CATALYSTS WHICH INCLUDES OXIDATION OF COKE IN THE PRESENCE OF WATER

[75] Inventor: William D. McHale, Swedesboro, N.J.

[73] Assignee: Mobil Oil Corporation, New York, N.Y.

[21] Appl. No.: 687,410

[22] Filed: Dec. 28, 1984

[51] Int. Cl.$^4$ .................. B01J 29/38; B01J 23/96; B01J 38/18; B01J 38/22

[52] U.S. Cl. ............................. 502/50; 208/111; 502/45; 502/51; 502/52

[58] Field of Search ..................... 502/50-53, 502/45-48; 208/111, 140

[56] References Cited

U.S. PATENT DOCUMENTS

| | | | |
|---|---|---|---|
| 2,906,702 | 9/1959 | Brennan et al. | 208/140 |
| 3,134,732 | 5/1964 | Kearby et al. | 208/140 |
| 3,661,768 | 5/1972 | Davis, Jr. et al. | 208/139 |
| 3,836,597 | 9/1974 | Sie | 208/140 |
| 3,855,343 | 12/1974 | Huang et al. | 260/683.44 |
| 3,899,441 | 8/1975 | Hansford | 252/411 R |
| 3,986,982 | 10/1976 | Crowson et al. | 252/415 |
| 4,255,251 | 3/1981 | Durkin | 502/51 |
| 4,463,209 | 7/1984 | Kursewicz et al. | 502/51 |
| 4,480,144 | 10/1984 | Smith | 585/481 |
| 4,481,103 | 11/1984 | Krambeck et al. | 208/120 |

OTHER PUBLICATIONS

Rabo, Jule A., Ed. *Zeolite Chemistry and Catalysis*, American Chemical Society, Washington, DC (1968), pp. 576-578.

Kunzelman et al, "Off-Site Regeneration of Refining Catalysts", 1980 National Petroleum Refineries Association Meeting, Mar. 23-25, 1980, New Orleans, LA.

*Primary Examiner*—P. E. Konopka
*Attorney, Agent, or Firm*—Alexander J. McKillop; Michael G. Gilman; Dennis P. Santini

[57] ABSTRACT

A process is described for regenerating a coke-deactivated platinum-containing zeolite catalyst material, which includes oxidizing the deactivated catalyst material in the presence of water under conditions which do not cause significant agglomeration of the platinum on the catalyst.

5 Claims, No Drawings

REGENERATION OF PLATINUM-CONTAINING ZEOLITE CATALYSTS WHICH INCLUDES OXIDATION OF COKE IN THE PRESENCE OF WATER

BACKGROUND OF THE INVENTION

1. Field of the Invention

The invention relates to a process of regenerating catalysts. In particular, it relates to the regenerating of platinum-containing zeolite catalysts which have been deactivated by coke build-up. Catalysts which may be regenerated by the process of the present invention include those that have become deactivated during hydrocarbon hydroprocesses, such as the reforming or catalytic dewaxing of hydrocarbon feedstocks.

2. Discussion of the Prior Art

Regeneration of platinum catalysts utilized in hydrocarbon hydroprocessing procedures such as reforming is known in the art. Processes which utilize chlorine and oxygen in catalyst reactivation are particularly well known. For example, U.S. Pat. No. 2,906,702 to Brennan et al discloses a method of restoring an alumina-supported platinum catalyst after deactivation occurring during the reforming of hydrocarbons. This method teaches contacting a deactivated platinum-alumina catalyst with a gaseous chlorine, fluorine, or other halogen or halogen-affording substance at an elevated temperature. U.S. Pat. No. 3,134,732 to Kearby et al teaches a method for reactivating noble metal catalyst supported on alumina by contacting the catalyst with halogen-containing gas, stripping excess halogen therefrom, and subjecting the resulting catalyst to a reduction step with a hydrogen-containing gas. In this disclosure, the agglomerated metal is present on the surface of the alumina as small crystallites. It is also known in the art to regenerate noble metal and platinum group metal-containing zeolite catalysts. Regeneration of noble metal-loaded zeolite catalysts required certain procedural modifications to regain the activity of the metal. U.S. Pat. No. 3,986,982 to Crowson et al treats deactivated platinum group metal-loaded zeolites by contacting them with a stream of an inert gas containing from 5 to 500 ppm volume of chlorine as chlorine, HCl, or an organic chlorine-containing material. The resulting catalyst is purged to remove residual oxygen and chlorine and then reduced in a stream of hydrogen at 200° to 600° C.

The treatment of noble metal-containing catalyst material with sulfur compounds is also known in the art. For example, U.S. Pat. No. 3,661,768 to Davis, Jr., et al describes a method of regenerating a bimetallic reforming catalyst, such as platinum-rhenium on alumina, which includes contacting the catalyst with hydrogen sulfide to convert platinum to platinum sulfide. Prior to sulfiding, the catalyst is contacted with chlorine and steam in order to effect chlorination.

Reactivating noble metal-containing catalyst material with water is also known in the art. For example, U.S. Pat. No. 4,480,144 to Smith discloses a regeneration process in which the catalyst is mildly steamed in order to enhance the catalyst activity. Specifically, the regeneration step comprises contacting the catalyst containing the carbonaceous materials with a continuous closed loop flow of a gas stream comprising oxidizing gas and steam at regeneration conditions. U.S. Pat. No. 3,899,411 to Hansford discloses a process directed to correcting "metal maldistribution". This rejuvenation process includes hydrating the catalyst in moist air, and then contacting the catalyst with gaseous ammonia until the liquid water phase is substantially saturated with ammonia. U.S. Pat. No. 3,855,343 to Huang et al discloses a regeneration process which utilizes a polar solvent, such as, e.g., water. U.S. Pat. No. 4,481,103 to Krambeck et al discloses an FCC cracking catalyst regeneration process in which the spent catalyst is contacted with steam at a temperature of 500° to 700° C. for about one to ten minutes. Additionally, a process for reactivating coked Y-type catalyst containing platinum or palladium hydrating the catalyst is disclosed in Rabo, Jule A., Ed. *Zeolite Chemistry and Catalysis*, American Chemical Society, Washington, D.C. (1968), pp. 576-578.

The regeneration of zeolite materials which contain noble metals, such as platinum, has been found to be particularly difficult. For example, some of the above treatments require certain precautions owing to the corrosive nature of the halogens used. Additionally, certain materials employed in these processes add significantly to the cost of catalyst regeneration. Further, in most of the above processes, catalysts in which the noble metal has been agglomerated thereon must be subsequently re-dispersed. For example, treatment of agglomerated platinum on silica, using a variety of chlorine-containing compounds with water and oxygen in an inert gas results in a large loss of platinum from the silica. Similarly, the zeolite regeneration process as described in U.S. Pat. No. 3,986,982 to Crowson et al has not been found suitable for use in regeneration of highly siliceous zeolites, i.e., zeolites having a framework silica-to-alumina ratio of at least about 20. Further, it has been found in commercial regeneration processes that the temperature parameters are difficult to control. In order to effectively regenerate a catalyst, the temperature must be high enough to keep the coke burning, but not so high as to agglomerate the metal on the catalyst. In commercial in situ units, if the oxygen begins to build up during the initial start-up phase due to the temperature falling below the ignition point, a subsequent rise in temperature will then have an uncontrolled burn effect on the zeolite catalyst, causing hot spots or flash burns. This uncontrolled temperature rise tends to facilitate noble metal agglomeration. Further, in a commercial reactor, the catalyst bed has to experience the burn for the entire reactor. In other words, the bottom of the catalyst bed experiences regeneration conditions at high temperatures for the entire regeneration process, which can be for a prolonged period.

It is thus an object to overcome the deficiencies of the prior art.

Further, it is an object to provide a process for regenerating a platinum-containing catalyst in which the platinum does not agglomerate on the catalyst.

Further still, it is an object of the present invention to provide a catalyst regeneration process which obviates the need to redisperse the platinum on the catalyst by regenerating the catalyst under controlled temperature and water conditions.

SUMMARY OF THE INVENTION

It has now been found that coke-deactivated platinum-containing zeolite catalyst materials can be regenerated without significant loss of the metal function activity therein and without significant agglomeration of the platinum on the zeolite catalyst material. In accordance with the present invention, a deactivated platinum-containing zeolite catalyst is regenerated by a method which comprises:

(1) contacting the catalyst with oxygen in the presence of water under conditions which oxidize the catalyst without causing significant agglomeration of the platinum on the catalyst, and (2) exposing the resulting catalyst material to hydrogen under reducing conditions.

The catalyst treated in accordance with the present invention exhibits enhanced activity due to the burn off of the deactivating coke without affecting the dispersion of the platinum on the catalyst.

DETAILED DESCRIPTION OF THE INVENTION

The present invention relates to a process for regenerating an aged platinum-containing zeolite catalyst material to provide a catalyst material of enhanced activity which retains a substantial portion of its noble metal in a dispersed form. The process comprises oxidizing the coke on the catalyst material with oxygen in the presence of water under suitable oxidizing conditions, and thereafter reducing the catalyst material by contact with hydrogen under suitable reducing conditions.

The zeolites which may be regenerated by the process of the present invention include large pore zeolites such as zeolite Y, Zeolite Beta, ZSM-3, ZSM-4, ZSM-18 and ZSM-20, as well as zeolites having a Constraint Index of about 1 to 12 and silica-to-alumina mole ratio greater than about 12. Examples of such materials include ZSM-5, ZSM-11, ZSM-5/ZSM-11 intermediates, ZSM-12, ZSM-23, ZSM-35, ZSM-38, ZSM-48 and other similar materials.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite Beta is described in U.S. Pat. No. 3,308,069. That description, including the X-ray diffraction pattern of Zeolite Beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. No. 3,702,886 and U.S. Pat. No. Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated hereby by reference.

Particularly preferred zeolites for the purposes of the present invention are those which have high silica-to-alumina mole ratios, e.g., greater than about 20 or even greater than 70 or 100.

Suitable conditions for oxidizing the coke on the catalyst include temperatures ranging from about 212° to 930° F. (100°–500° C.), preferably about 500° to 850° F., and pressures ranging from about 0 to 400 psig. It is preferred that the oxidizing conditions be mild enough to prevent any alteration in the crystal structure of the zeolite being treated and to prevent agglomeration of the platinum durng the regeneration procedure. The catalyst material is contacted with a fluid or gas stream containing oxygen as well as water. Generally, the stream may contain about 0.3 to 21 volume % oxygen, preferably 1 to 3 volume % oxygen, and about 0.1 to 5 volume %, preferably 1.5 to 3.0 volume % water. The presence of water prevents or reduces agglomeration of the platinum dispersed throughout the catalyst during the removal of coke from the zeolite catalyst material.

The reducing procedure which follows removal of the coke from the catalyst material utilizes any suitable reducing agent, preferably hydrogen. Reduction of the catalyst material is achieved by contacting it with the reducing agent under suitable reducing conditions. These include temperatures ranging from about 570° to 930° F. (300°–500° C.), preferably about 660° to 840° F. (350°–450° C.), and contact times ranging from about 1 to 10 hours, preferably about 2 to 5 hours. Where the reducing agent is in the gaseous form, e.g., hydrogen, said reduction is carried out at pressures ranging from about 0 to 400 psig, preferably about 150 to 250 psig.

The catalyst may be regenerated in situ, i.e., within the catalytic reactor, or in an offsite regeneration facility as long as the regeneration process conforms to the above-mentioned oxidation conditions. Although the regeneration process may be performed in situ or offsite, an offsite regenerator is preferred for the following reasons. First, it is difficult to control the temperature of an in situ regeneration process. Generally, in order to keep the burn temperature as low as possible in an in situ regeneration unit, there is an ever present risk of the burn ceasing should the temperature fall below the ignition point. This would result in a buildup of excess oxygen. As the temperature is then raised to re-initiate coke burning, the combination of the oxygen and the temperature rise creates an uncontrolled or "flash" burn, which facilitates platinum agglomeration. Secondly, in a commercial reactor in which the catalyst bed is undergoing regeneration, the bottom portion of the catalyst bed must experience coke burn-off conditions until the entire catalyst bed is regenerated. This submits the lower portion of the catalyst bed to extended regeneration conditions.

Offsite regenerators are well known to the art and are described, for example, in Kunzelman et al, "Off-Site Regeneration of Refining Catalysts", paper presented at 1980 National Petroleum Refineries Association Meeting, Mar. 23-25, 1980, to which reference is made for details of an off-site regenerator. Generally, the catalyst is loaded onto a regenerator belt where it is spread out in a uniformly thin layer, approximately 0.5 to 0.75 inches in depth across the width of the belt. The catalyst then moves with the belt through a heating zone in which the catalyst bed depth, the temperature of the zone, and the amount of oxygen and water all must be controlled. Suitable offsite regeneration conditions include temperatures between 500° and 800° F. (260°-430° C.), preferably 550° and 725° F. (290°-385° C.), pressures between 0 and 100 psig, preferably 0 psig, oxygen in an amount between 1 and 21 volume %, and water in an amount between 0.1 and 5.0 volume %, preferably between 1.5 and 3.0 volume %. The time of the burn is determined by the coke level desired, but the catalyst is exposed to the controlled regeneration conditions only for the duration of time required to meet its own specifications. Thus, the dispersion of platinum during the regeneration of the catalyst is prevented by careful control of the temperaure and time of the regeneration process, the volume of oxygen and water added, and the depth of the catalyst bed.

The process of the present invention will now be shown by examples, which are not intended to limit its scope.

EXAMPLES 1-4

Examples 1-4 illustrate the benefit of adding water during oxygen regeneration on the platinum agglomeration of a coked 0.6% Pt/Zeolite Beta catalyst. The Examples simulate regeneration processes both in situ at 100 psig and offsite at atmospheric pressure. Parallel runs were performed, with and without water, to specifically determine the effect of water on platinum agglomeration. Platinum agglomeration was determined by X-ray line broadening techniques. Fresh 0.6% Pt/Zeolite Beta having an agglomeration standard of 0.01 wt % Pt (wt % Pt measured at greater than 50 Angstroms) was used in each of the experiments.

The run conditions and results are listed on the following table.

|  | Example | | | |
|---|---|---|---|---|
|  | 1 | 2 | 3 | 4 |
| Regeneration Site | In-situ | In-situ | Offsite | Offsite |
| 1st Regeneration Time | 3 Days | 3 Days | 4 Hours | 4 Hours |
| Temperature, °F.(°C.) | 850(454) | 850(454) | 650(343) | 650(343) |
| 2nd Regeneration Time | — | — | 4 Hours | 4 Hours |
| Temperature, °F.(°C.) | — | — | 850(454) | 850(454) |
| Oxygen, Torr | 360 | 360 | 160 | 160 |
| Water, Torr | 0 | 70 | 0 | 20 |
| Pt Agglomeration, Wt % Pt | 0.23 | 0.14 | 0.08 | 0.04 |

As illustrated in the Table, the addition of water in Examples 2 and 4 resulted in a significant decrease in platinum agglomeration during the regeneration process. Further, the addition of water during the offsite regeneration process resulted in a significant decrease in platinum agglomeration over any of the conditions listed in Examples 1-3.

Thus, the process of the present invention minimizes platinum agglomeration during the regeneration process and, accordingly, obviates the need to redisperse platinum over the catalyst during a rejuvenation process.

Although the invention has been described in conjunction with a specific embodiment, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A process for regenerating a coke-deactivated catalytic dewaxing platinum-Zeolite Beta catalyst, which consists essentially of the following steps in sequence:
   (1) contacting said Zeolite Beta catalyst with from 1 to 21 volume % oxygen in the presence of from 1.5 to 3.0 volume % water at a temperature of from 290° to 385° C., and a pressure of about 0-400 psig in an offsite thin-layer moving bed regenerator under conditions such that said Zeolite Beta catalyst is oxidized without causing significant agglomeration of said platinum on said Zeolite Beta catalyst; and
   (2) exposing the resulting Zeolite Beta catalyst to hydrogen at a temperature of from 350° to 450° C. and a pressure of from 150 to 250 psig at a contact time ranging from about 2 to 5 hours.

2. The process of claim 1, wherein said oxygen is in the form of air.

3. The process of claim 1, wherein said Zeolite Beta has a silica-to-alumina mole ratio no less than 20.

4. The process of claim 1, wherein said Zeolite Beta has a silica-to-alumina mole ratio no less than 70.

5. The process of claim 1, wherein said Zeolite Beta further comprises inorganic binders selected from alumina, silica, silica-alumina, magnesium, titania, zirconia, or thoria.

* * * * *

UNITED STATES PATENT AND TRADEMARK OFFICE
CERTIFICATE OF CORRECTION

PATENT NO. : 4,600,700

DATED : July, 15, 1986

INVENTOR(S) : William D. McHale

It is certified that error appears in the above-identified patent and that said Letters Patent is hereby corrected as shown below:

Column 4, line 37, change "durng" to --during--

Column 6, line 1 of Claim 5, insert --catalyst-- after "Beta"

Signed and Sealed this

Thirtieth Day of December, 1986

Attest:

DONALD J. QUIGG

Attesting Officer

Commissioner of Patents and Trademarks